Oct. 25, 1949.                    L. A. MAJNERI                    2,486,046
                         PARKING VALVE ASSEMBLY FOR
                          BRAKE APPLYING MECHANISM
Filed Oct. 21, 1946                                         4 Sheets-Sheet 1
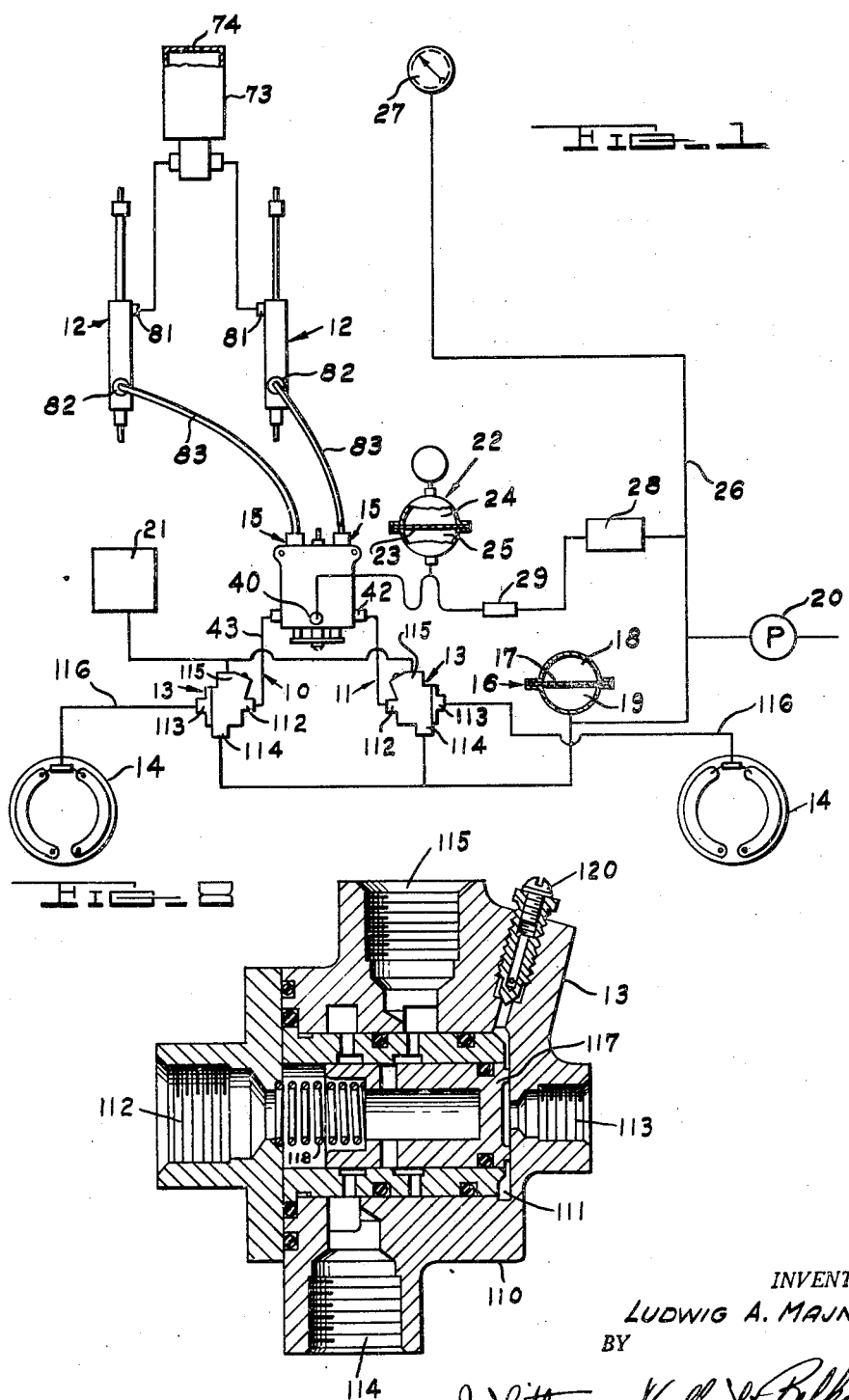
INVENTOR.
LUDWIG A. MAJNERI
BY
Whittemore Hulbert & Belknap
ATTORNEYS

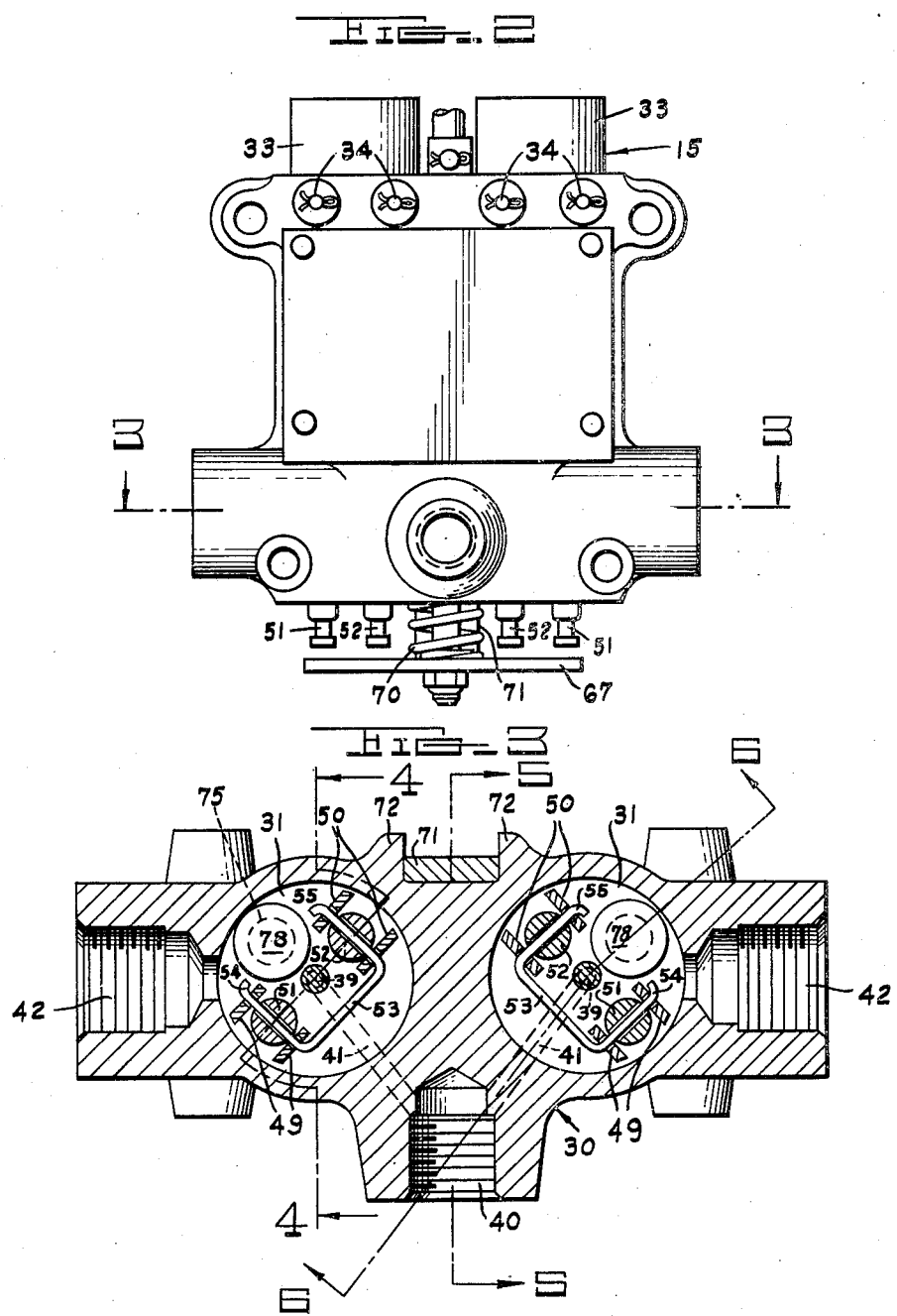

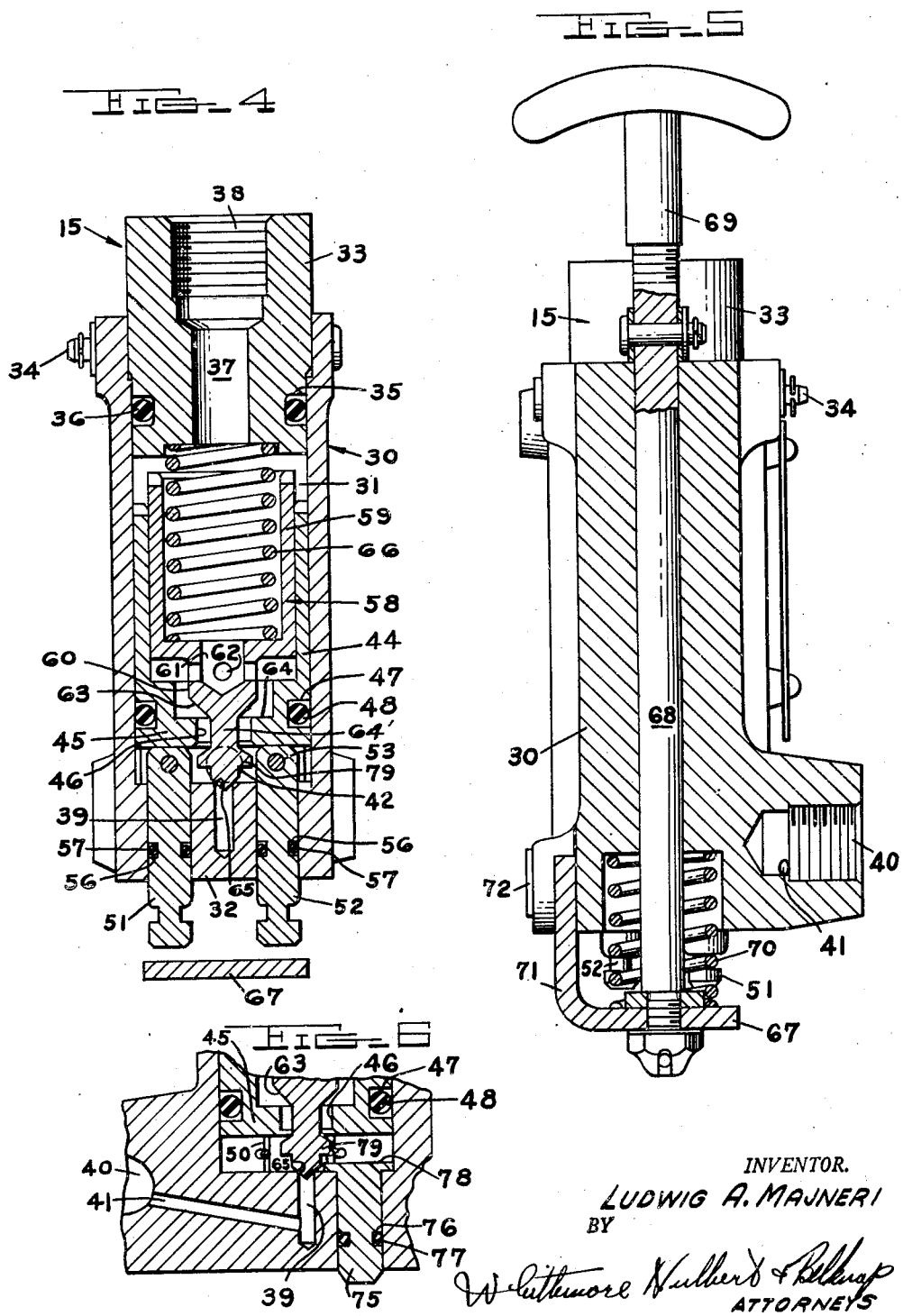

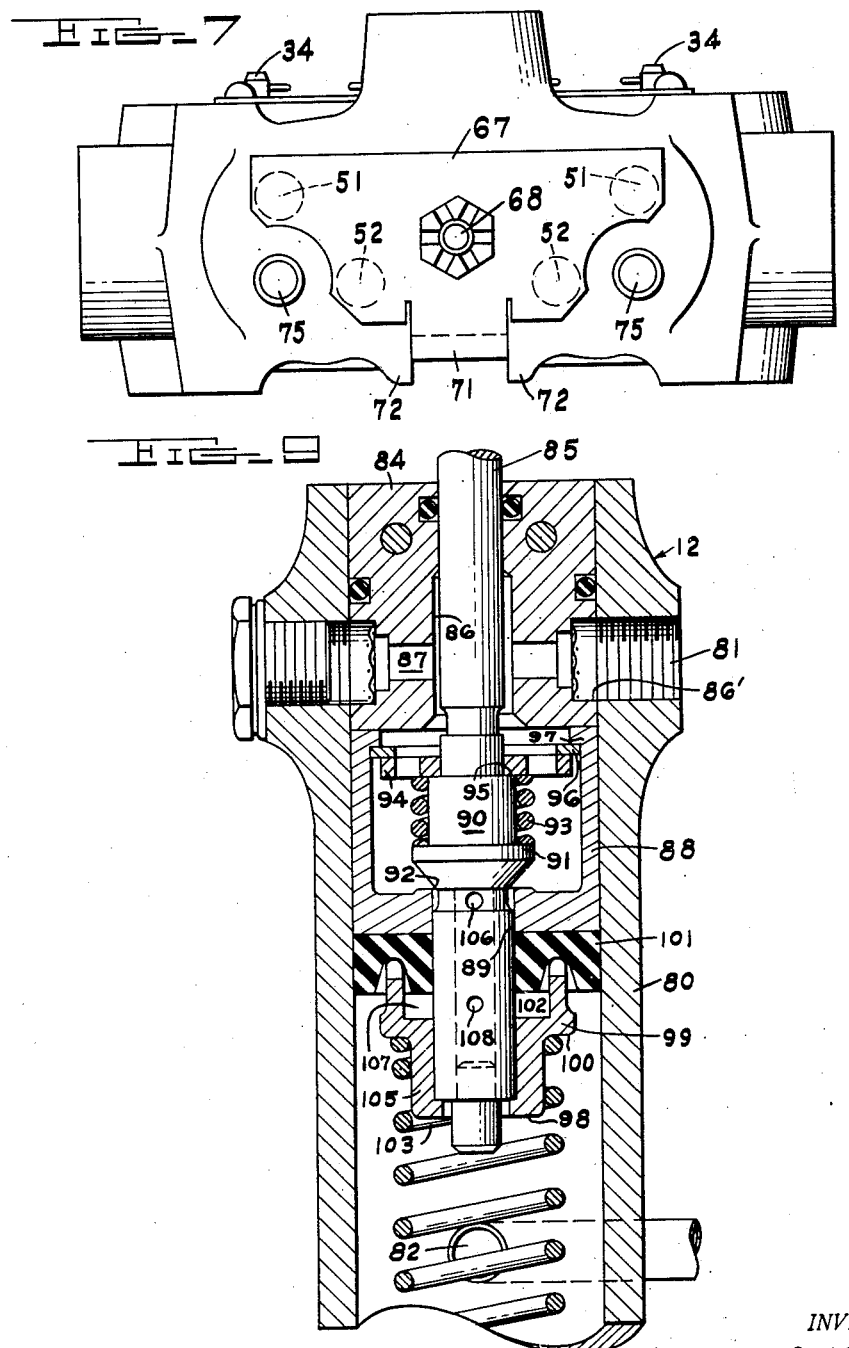

Patented Oct. 25, 1949

2,486,046

UNITED STATES PATENT OFFICE 2,486,046

PARKING VALVE ASSEMBLY FOR BRAKE APPLYING MECHANISM

Ludwig A. Majneri, Grosse Pointe, Mich., assignor to The Warner Aircraft Corporation, Detroit, Mich., a corporation of Michigan Application October 21, 1946, Serial No. 704,605

8 Claims. (Cl. 277—20)

This invention relates generally to hydraulic brake applying mechanism and refers more particularly to improvements in mechanism of the above type embodying two independent systems having parking facilities for the brakes.

The invention concerns itself still more particularly with hydraulic brake operating mechanism of the type used on aircraft and comprises two independent systems for selectively or simultaneously applying the brakes associated with the ground engaging wheels. In the manufacture of aircraft, and particularly the larger types of aircraft, it is customary to provide an accumulator containing hydraulic fluid medium under relatively high pressure, and to connect the accumulator to the respective brake actuators through power valves. The power valves are respectively positioned in the two brake applying systems, and are selectively or simultaneously manually operated by a pair of control units or master cylinders. The control units are usually located in the pilot's compartment of the aircraft remote from the brake actuators, and the power valves are preferably positioned as closely as possible to the brake actuators, so that the brakes may be practically instantaneously applied with a minimum displacement of hydraulic fluid in the control units. It is also customary in brake applying mechanism of the above general type to locate a pressure gage on the instrument panel in the pilot's compartment of the aircraft and to connect the gage to the accumulator by a conduit, so that the pilot is informed at all times of the pressure condition existing in the accumulator. In addition, provision is usually made for parking the brakes and, in orthodox systems, the control units are usually relied upon to actuate or at least control the operation of the parking valves. In many installations the parking means provided requires the introduction of additional fluid conduits extending from the actuators to the parking means, and the weight represented by these conduits is appreciable, especially in the larger types of aircraft.

With the above in view, it is one of the objects of this invention to equip the brake applying mechanism with improved brake parking facilities without the disadvantage of providing the separate or additional fluid conduits required in installations of the type briefly described in the preceding paragraph.

It is a more specific object of this invention to supply the brake actuators with the required parking pressure from a source of fluid under a predetermined pressure supplied by the conduit connecting the accumulator to the indicating gage, and to provide parking valve assemblies operable independently of the master cylinders to control the flow of fluid under pressure from the conduit or source of fluid supply to the brake actuators.

Another feature of this invention is to provide parking valve assemblies respectively located in the fluid connections between the discharge sides of the two control units and associated brake actuators and having valve means normally positioned to permit relatively free transfer of pressure from the control units to the actuators and movable to positions wherein the fluid connections extending from the control units to the brake acuators are closed and wherein communication is established between the source of fluid under pressure and the brake actuators.

Still another object of this invention is to provide a manually operable control located in a convenient position for manipulation by the pilot, and connected to the parking valves for simultaneously operating the latter independently of the master cylinders or control units.

A further object of this invention is to provide selectively operable means for operating the parking valves to connect the source of fluid under pressure to both the brake actuators and to the control units or master cylinders. This feature is highly advantageous in that it renders it possible to fill and bleed the systems from the source of fluid under pressure, or in other words, from the conduit extending from the accumulator to the pressure gage.

The foregoing as well as other objects will be made more apparent as this description proceeds, especially when considered in connection with the accompanying drawings, wherein:

Figure 1 is a diagrammatic view showing brake applying mechanism embodying two independently hydraulic systems;

Figure 2 is an elevational view of the parking valve assembly embodied in the brake applying mechanism shown in Figure 1;

Figure 3 is a sectional view taken substantially on the plane indicated by the line 3—3 of Figure 2;

Figures 4, 5 and 6 are respectively sectional views taken on the plane indicated by the lines 4—4, 5—5, and 6—6 of Figure 3;

Figure 7 is a bottom plan view of the parking valve assemblies;

Figure 8 is a sectional view through one of the power valves embodied in the brake applying mechanism; and Figure 9 is a sectional view of one of the control units or master cylinders.

In Figure 1 of the drawings I have illustrated diagrammatically a hydraulic brake applying mechanism comprising two independent systems 10 and 11. Each system embodies a control unit or master cylinder 12, a power valve 13, brake actuators 14 and parking valves 15. The two power valves 13 are respectively located in the systems between the brake actuators 14 and a source of hydraulic fluid medium under pressure comprising an accumulator 16 having a flexible diaphragm 17 dividing the interior of the accumulator into two chambers 18 and 19. The lower chamber 19 communicates with the pressure side of a pump 20 having the intake side connected to a source of hydraulic fluid medium, and the upper chamber 18 contains a compressible fluid medium such as air.

The power valves 13 are selectively controlled or operated by the master cylinders 12 to alternatively connect the brake actuators 14 to the chamber 19 of the accumulator 16 and to a reservoir 21. In actual practice the power valves 13 are located as closely as possible to the brake actuators 14 in order to transfer pressure to the actuators with a minimum displacement of hydraulic fluid medium by the master cylinders. Although the power valves 13 may be any one of a number of orthodox constructions, nevertheless, the operation of these valves will be presently described more in detail to facilitate an understanding of the operation of the brake applying mechanism.

The parking valves 15 are respectively located in the fluid connections between the delivery sides of the control units or master cylinders 12 and the power valves 13. The parking valves are normally positioned to permit free transfer of pressure from the control units 12 to the power valves 13 and also have a fluid connection with a source of fluid under a predetermined pressure. This source of fluid comprises a second accumulator 22 having a flexible diaphragm 23 dividing the interior of the accumulator into two chambers 24 and 25. The chamber 24 contains a compressible fluid medium such as air, and the chamber 25 is adapted to contain a supply of hydraulic fluid medium. As shown in Figure 1 of the drawings, the chamber 25 is connected to a conduit 26 which extends from the accumulator 16 to a pressure gage 27 supported in the pilot's compartment in a position where it may be readily observed by the pilot. Inasmuch as the conduit 26 is an essential part of the brake applying mechanism, it follows that fluid under pressure is supplied to the accumulator 22 without the necessity of providing additional conduits.

In installations where the primary accumulator 16 contains hydraulic fluid medium under relatively high pressure, it is preferred to provide a pressure reducing valve 28 between the accumulator 22 and the conduit 26. In order to prevent reverse flow of hydraulic fluid medium from the accumulator 22, a check valve 29 is provided between the accumulator 22 and the pressure reducing valve 28. It is possible that air may be liberated from the hydraulic fluid medium when the pressure is reduced by the valve 28 and with this in view, the conduit extending from the check valve to the accumulator is shaped, as indicated in Figure 1, to provide a trap arranged to prevent this air from entering the parking valve assemblies 15.

In the present instance the two parking valve assemblies 15 are housed in a common casting or casing 30 compact in design and adapted to be secured in any suitable position on the aircraft. Both parking valve assemblies are identical in construction and a detail description of one will suffice for both. Referring to Figure 4 of the drawings, it will be noted that the parking valve assembly shown comprises an elongated chamber 31 closed at the lower end by a wall 32 forming a part of the bottom wall of the housing 30 and closed at the upper end by a plug 33. The plug 33 is sleeved into the upper end of the chamber 31 and is secured in place by pins 34. An annular groove 35 is formed in the periphery of the plug 33 adjacent the lower end of the latter, and an O-ring 36 is positioned in the groove. The outside diameter of the O-ring 36 is greater than the depth of the groove 35, so that the O-ring is held under compression against the inner wall of the chamber 31 and prevents the escape of hydraulic fluid medium from the upper end of the chamber 31 past the plug 33. The plug 33 is centrally bored to provide a passage 37 communicating at the upper end with a port 38, which in turn, is connected to the delivery end of one of the control units 12.

The end wall 32 of the chamber 31 is centrally bored to form a passage 39 having the lower end connected to a second inlet port 40 by a passage 41. The inlet port 40 is connected to the chamber 25 of the accumulator 22 and receives hydraulic fluid medium under pressure from this accumulator. The chamber 31 is also formed with an outlet port 42 which is connected to one of the brake actuators 14 through the associated power valve 13 by a conduit 43.

Supported in the chamber 31 for sliding movement between the inlet port 38 and the outlet port 42 is a sleeve 44 closed at the lower end by a wall 45 having an opening 46 therethrough. An annular groove 47 is formed in the periphery of the sleeve adjacent the wall 45 and an O-ring 48 is located in the groove 47. The periphery of the O-ring 48 frictionally engages the inner wall of the chamber 31 and provides a fluid-tight seal around the sleeve 44. As shown particularly in Figure 3 of the drawings, two pairs of lugs 49 and 50 are formed on the bottom wall 45 of the sleeve 44 at diametrically opposite sides of the opening 46. A pin 51 is slidably supported in a bore formed in the end wall 32 of the chamber, and the upper end of the pin 51 projects between the pair of lugs 49. A second pin 52 is slidably supported in another bore formed in the bottom wall 32 of the chamber 31, and the upper end of this pin projects between the pair of lugs 50. The upper ends of the pins are respectively secured to the pairs of lugs by a U-shaped spring clip 53. One leg 54 of the clip projects through aligned openings formed in the lugs 49 and pin 51, while the other leg 55 of the clip projects through aligned openings formed in the lugs 50 and pin 52. Referring again to Figure 4 of the drawings, it will be noted that each pin has an annular groove 56 formed in the periphery intermediate the ends thereof and an O-ring 57 is seated in each groove. The peripheral portions of the O-rings respectively frictionally engage the inner surfaces of the bores through which the pins project and provide a fluid-tight seal around each pin.

A valve member 58 is located in the chamber 31 and is provided with a sleeve-like portion 59 arranged to slide within the sleeve 44. The bottom wall of the portion 59 is formed with a depending part 60 having a passage 61 communicating with the interior of the sleeve 44 through ports 62. The diameter of the part 60 is greater than the diameter of the opening 46, and the part 60 is tapered toward the axis of the valve member to form an annular seat engaging surface 63. The surface 63 is adapted to engage an annular valve seat 64 surrounding the opening 46 to close communication between the inlet port 38 and the ports 40 and 42. It will further be noted from Figure 4 of the drawings that the part 60 has a reduced depending extension 64' which projects downwardly through the opening 46 and is adapted to engage an annular valve seat 65 surrounding the delivery end of the passage 39 to close communication between the inlet port 40 and the outlet port 42. It will, of course, be understood that when the passage 39 is closed by the extension 64', communication between the inlet port 40 and the inlet port 38 is also closed. The valve member is normally located in the above position by means of a coil spring 66 housed in the sleeve-like portion 59 of the valve member with the opposite ends respectively abutting the plug 33 and the bottom wall of the sleeve-like portion 59. When the valve member 58 is positioned by the spring 66 to close the second inlet port 40, the surface 63 on the valve member is spaced above the valve seat 64. As a result pressure may be freely transferred from the inlet port 38 to the outlet port 42. In other words, the parking valves are normally located in a position where they do not interfere with the transfer of pressure from the master cylinders 12 to the power valves 13.

As shown particularly in Figures 2 and 7 of the drawings, a plate 67 is supported below the lower ends of the pins 51 and 52. The plate 67 is secured at its center to an operating rod or plunger 68 which extends upwardly through the casting or casing 30 between the chambers 31 and is provided with a handle 69 at the upper end thereof. The plate 67 is normally held in spaced relation to the pins 51 and 52 by means of a coil spring 70 surrounding the lower end of the plunger 68. The upper end of the spring abuts the casing 30 and the lower end of the spring engages the plate 67. In this connection it will be noted that the plate 67 is prevented from rocking movement relative to the rod 68 by a finger 71 which projects upwardly from the plate between a pair of lugs 72 formed on the casing 30. The above construction is such that an upward pull exerted on the rod 68 by grasping the handle 69 moves the plates 67 against the action of the spring 70 into engagement with pins 51 and 52. Continued upward movement of the plate 67 effects a corresponding movement of the pins 51 and 52 associated with both parking valves. Inasmuch as the upper ends of the pins are attached to the lower ends of the sleeves 44, it follows that the sleeves are also moved upwardly to engage the valve seats 64 with the surfaces 63 on the valve members. It will also be noted that as the sleeves 44 move upwardly, the depending extensions 64' are raised from the valve seats 65. When the valve members are in the above positions, the accumulator 22 is connected to the outlet ports 42 through the second inlet ports 40 and the first inlet ports 38 are closed, so that fluid pressure from the accumulator 22 can not be transferred to the control units or master cylinders 12. Thus, fluid under pressure from the accumulator 22 is employed to operate the power valves to connect the brake actuators to the primary accumulator 16 for parking the brakes.

The sleeves 44 are held in their parked or uppermost positions against the action of the springs 66 by the force exerted on the bottom walls of the sleeves 44 by the fluid under pressure passing from the inlet ports 40 to the outlet ports 42. However the parking valves may be readily released by merely manipulating the two master cylinders 12 to transfer sufficient pressure to the parking valves to move the sleeves and valve members downwardly with the assistance of the springs 66. In this connection it will be noted that the upper ends of the sleeve-like portions 59 are slotted to enable fluid under pressure admitted through the inlet port 38 to act on the upper end of the sleeves 44 as well as on the valve member 58. Inasmuch as the passages 39 or second inlet ports 40 are closed in response to downward movement of the valve members 58, it follows that the small amount of fluid actually displaced to effect parking of the brakes readily returns through the openings 46 to the control units or master cylinders 12. Owing to the construction of these master cylinders to be presently described, this fluid is transmitted to a reservoir 73 and assists in maintaining the reservoir in a filled condition. The reservoir 73 is of the usual construction having a vent port 74 so that excess fluid may be spilled out of the reservoir in the event the latter is filled beyond capacity.

Another important feature of this invention is to enable filling and bleeding of the hydraulic brake applying mechanism with hydraulic fluid medium contained in the accumulator 22. As shown in Figure 6 of the drawings, each parking valve assembly is provided with a plunger 75, and this plunger is slidably supported in a bore formed in the end wall of the parking valve chamber 31. An annular groove 76 is formed in the periphery of the plunger intermediate the ends of the latter, and an O-ring 77 is located in the groove for frictional engagement with the adjacent surface of the bore to provide a fluid-tight seal around the plunger. The upper end of the plunger is formed with a head 78, and this head is adapted to engage an enlargement 79 formed on the lower end portion of the valve member 58 and having a diameter slightly less than the diameter of the opening 46. The arrangement is such that upward movement of the plunger effects a slight upward movement of the associated valve member 58 and establishes communication between the second inlet port 40 and the outlet port 42. As a result, fluid under pressure from the accumulator 22 may be bypassed through both parking valves to all parts of the systems 10 and 11. It will be understood that the plungers for the two parking valves may be individually or simultaneously operated to enable selectively filling and bleeding the systems.

The master cylinders 12 are identical in construction and may embody any one of a number of orthodox designs. One type of conventional master cylinder is shown in Figure 9 of the drawings and a description of this master cylinder will suffice for both. Briefly, the numeral 80 indicates a cylinder having an intake port 81 adjacent the upper end thereof and having a discharge port 82 adjacent the lower end thereof. The intake port 81 is connected to the fluid reservoir 73, and the discharge port 82 is connected to the inlet port 38 of the associated parking valve by a flexible conduit 83. The lower end of the cylinder is closed in any suitable manner, and the upper end thereof is closed by a plug 84 centrally bored to receive a manually operable plunger 85. The bore through the plug 84 is enlarged to form a passage 86 around the plunger and an annular groove 86' is formed in the outer surface of the plug 84 in registration with the intake port 81 to receive fluid from the latter. The annular groove 86' is connected to the passage 86 by a plurality of passages 87 extending radially from the passage 86 to the annular groove 86'.

A cup-shaped piston 88 is slidably supported in the cylinder 80 between the plug 84 and the discharge port 82. The base of the piston has a central passage 89 therethrough for slidably receiving a valve member 90 forming an extension of the plunger 85. An enlargement 91 is formed on the valve member and occupies a position above the base of the cup-shaped piston 88. The enlargement 91 is formed with a conical surface engageable with a valve seat 92 surrounding the passage 89 through the piston 88 and normally urged into engagement with the valve seat 92 by a coil spring 93 surrounding the valve member 90 above the enlargement. The bottom of the coil spring 93 rests on the enlargement 91 and the upper end engages an apertured plate 94. The plate is seated on an annular shoulder 95 formed on the valve member 90 and is held in place by a spring clip 96. The clip 96 is secured in the upper end of the piston 88 against an annular flange 97 extending inwardly from the top of the piston.

A cap 98 is secured on the lower end of the valve member 90 below the piston 88 and is formed with an enlargement 99 at the upper end providing an annular shoulder 100. The top edge of the enlargement 99 engages a resilient washer 101 fixed to the base of the piston 88 and having concentric lips 102. The outer lip frictionally engages the inner wall of the cylinder and the inner lip frictionally engages the valve member. Thus fluid leakage past the piston and valve member is avoided. A coil spring 103 of greater strength than the spring 93 acts on the shoulder 100 to urge the piston 88 in its uppermost position against the plug 84.

In the open position of the valve member 90, fluid is bypassed through the valve member by a passage 105 formed in the lower end of the valve member and connected to the passage 89 through the piston 88 by a port 106. The passage 105 is also connected to the space 107 formed by the annular enlargement 99 on the cap 98 by a port 108. The top edge of the annular enlargement 99 is cut away to enable fluid to flow from the space 107 to the discharge port 82 in the cylinder 80.

The master cylinder is shown in Figure 9 in its released position wherein the passage 89 through the piston is opened by the valve member 90. Thus hydraulic fluid medium is free to flow from the reservoir 73 through the piston 88 to replenish the brake system, or may flow from the brake system through the piston 88 to the reservoir. As a result of the above construction, it will be noted that subsequent to operation of the master cylinders to release the parking valves from their respective parking positions, the hydraulic fluid medium displaced to effect the parking operation may readily return to the reservoir 73 through the master cylinder pistons 88 immediately upon releasing the master cylinders.

In Figure 8 of the drawings, a typical power valve is shown. Both power valves are identical in construction, and accordingly, a description of one will suffice for both. Briefly, the power valve shown in Figure 8 comprises a casing 110 having a chamber 111 and having four ports indicated by the reference characters 112, 113, 114 and 115. The port 112 is connected to the outlet port 42 of the associated parking valve, and the port 113 is connected to the brake actuator 14 by a conduit 116. The port 114 is connected to the chamber 19 of the accumulator 16 for receiving hydraulic fluid medium under pressure from the latter, and the port 115 is connected to the reservoir 21. A valve member 117 is slidably mounted in the chamber 111, and is normally urged to the position thereof shown in Figure 8 of the drawings by a spring 118. In this latter or inoperative position of the valve member, the actuator 14 is connected to the reservoir 21 through the ports 113 and 115. However, when fluid under pressure is supplied to the port 112 from the associated parking valve 15, the valve member moves against the action of the spring 118 and connects the ports 113 and 114. In this latter position of the valve member, the accumulator 16 is connected to the brake actuator 14 and the latter is operated to apply the associated brake. The valve member 117 remains in the above operative position until the pressure is released or until the pressure exceeds a predetermined value. In the event the pressure does exceed the desired brake applying pressure, the valve member 117 again connects the brake actuator to the reservoir and thereby effects a reduction in the brake applying pressure. Actually, during brake application, the valve member 117 is free to move in opposite directions in the valve chamber 111 to alternatively connect the brake actuator 14 to the accumulator 16 and reservoir 21.

Attention is also called to the fact that the valve chamber 111 communicates with the atmosphere through a filling and bleeding valve 120. This valve is normally closed, but may be readily opened during the filling and bleeding operation. When it is desired to fill and bleed both systems simultaneously, the valves 120 on both the power valves 13 are open to the atmosphere and the plungers 75 on the parking valves are operated to connect the accumulator 22 to both the inlet ports 38 and the outlet ports 42. Inasmuch as the master cylinders 12 are in their released positions, hydraulic fluid medium may flow through the pistons of the master cylinders into the reservoir 73 and may also flow from the second accumulator 22 to the chambers 111 of the power valves. The plungers 75 are held open until hydraulic fluid medium discharges from the valves 120 and from the vent opening 74 at the upper end of the reservoir 73. The valves 120 are then closed while the bleeder pins 75 are depressed, and the bleeder pins are released as soon as the valves are closed.

Thus from the foregoing, it will be noted that the parking valves 15 enable employing fluid under pressure from a source other than the master cylinders to effect parking of the brakes. It will further be noted that the parking valves also enable filling and bleeding the hydraulic brake applying mechanism from the accumulator.

What I claim as my invention is:

1. A parking valve for hydraulic brake applying mechanism, comprising a chamber having spaced first and second inlet ports, an outlet port adjacent the second inlet port, valve means in said chamber normally closing communication between the second inlet port and said outlet port and normally permitting free transfer of pressure from the first inlet port to the outlet port, and means for operating said valve means to close communication between the first inlet port and outlet port and to establish communication between the second inlet port and outlet port.

2. A parking valve for hydraulic brake applying mechanism, comprising a chamber having spaced first and second inlet ports, an outlet port adjacent the second inlet port, valve means in said chamber normally closing communication between the second inlet port and said outlet port and normally permitting free transfer of pressure from the first inlet port to the outlet port, means for operating the valve means to close communication between the first inlet port and said outlet port and to establish communication between the second inlet port and outlet port, and additional means for operating the valve means to establish communication between the outlet port and both of said inlet ports.

3. A parking valve for hydraulic brake applying mechanism, comprising a casing having laterally spaced chambers, each chamber having spaced first and second inlet ports and having an outlet port, valve means in each chamber normally positioned to permit free transfer of pressure from the first inlet port to the outlet port and to close communication between the second inlet port and said outlet port, and means for simultaneously operating the valve means in said chambers to close communication between the first inlet port and said outlet port and to establish communication between the second inlet port and the outlet port.

4. A parking valve for hydraulic brake applying mechanism, comprising a casing having laterally spaced chambers, each chamber having spaced first and second inlet ports and having an outlet port, valve means in each chamber normally positioned to permit free transfer of pressure from the first inlet port to the outlet port and to close communication between the second inlet port and said outlet port, and means for simultaneously operating the valve means in said chambers to close communication between the first inlet port and said outlet port and to establish communication between the second inlet port and the outlet port, and additional operating means for selectively operating the valve means in said chambers to establish communication between the outlet port and both of said inlet ports.

5. A parking valve for hydraulic brake applying mechanism, comprising a chamber having spaced first and second inlet ports and having an outlet port adjacent the second inlet port, a sleeve slidably supported in the chamber between the inlet ports and having the end thereof adjacent the second inlet port closed by a wall formed with an opening therethrough a valve member slidably supported in the sleeve and having an extension projecting through the opening into engagement with a valve seat for closing the second inlet port, a fluid passage through the valve member connecting the opening to the first inlet port, an enlargement on the extension of the valve member responsive to initial movement of the sleeve in a direction toward the first inlet port to engage a valve seat surrounding the opening to close the latter and responsive to continued movement of the sleeve in the same direction to move the valve member in a corresponding direction sufficiently to connect the second inlet port to said outlet port, and means for operating the sleeve.

6. A parking valve for hydraulic brake applying mechanism, comprising a chamber having spaced first and second inlet ports and having an outlet port adjacent the second inlet port, a sleeve slidably supported in the chamber between the inlet ports and having the end thereof adjacent the second inlet port closed by a wall formed with an opening therethrough, a valve member slidably supported in the sleeve and having an extension projecting through the opening into engagement with a valve seat for closing the second inlet port, a fluid passage through the valve member connecting the opening to the first inlet port, an enlargement on the extension of the valve member responsive to initial movement of the sleeve in a direction toward the first inlet port to engage a valve seat surrounding the opening to close the latter and responsive to continued movement of the sleeve in the same direction to move the valve member in a corresponding direction sufficiently to connect the second inlet port to said outlet port, spring means acting on the valve member resisting movement in a direction toward the first inlet port, means for moving the sleeve in the direction aforesaid, and means for moving the valve member independently of the sleeve to connect the second inlet port to both the first inlet port and outlet port.

7. A parking valve for hydraulic brake applying mechanism, comprising a chamber closed at one end and having a first inlet port at the opposite end, a second inlet port and an outlet port at the closed end, a sleeve slidably supported in the chamber between the inlet ports and having the end adjacent the closed end of the chamber closed by a wall formed with an opening therethrough, a valve member slidably supported in the sleeve and having an extension projecting through the opening into engagement with a valve seat surrounding the second inlet port to close the latter, spring means acting on the valve member urging the extension against said seat, a fluid passage through the valve member connecting the first inlet port to said opening, an enlargement on the extension of the valve member responsive to initial movement of the sleeve in a direction toward the first inlet port to engage the valve seat surrounding the opening to close the latter and operable upon continued movement of the sleeve in the same direction to effect a sufficient movement of the valve member in a corresponding direction to connect the second inlet port to the outlet port, a pin slidably supported in a bore formed in the closed end of the chamber and having the inner end connected to the sleeve, and means engageable with the outer end of the pin to actuate the sleeve.

8. A parking valve for hydraulic brake applying mechanism, comprising a chamber closed at one end and having a first inlet port at the opposite end, a second inlet port and an outlet port at the closed end, a sleeve slidably supported in the chamber between the inlet ports and having the end adjacent the closed end of the chamber closed by a wall formed with an opening therethrough, a valve member slidably supported in the sleeve and having an extension projecting through the opening into engagement with a valve seat surrounding the second inlet port to close the latter, spring means acting on the valve member urging the extension against said seat, a fluid passage through the valve member connecting the first inlet port to said opening, an enlargement on the extension of the valve member responsive to initial movement of the sleeve in a direction toward the first inlet port to engage the valve seat surrounding the opening to close the latter and operable upon continued movement of the sleeve in the same direction to effect a sufficient movement of the valve member in a corresponding direction to connect the second inlet port to the outlet port, a pin slidably supported in a bore formed in the closed end of the chamber and having the inner end connected to the sleeve, means engageable with the outer end of the pin to actuate the sleeve, and a plunger slidable in another bore formed in the closed end of the chamber and engageable with the valve member to move the latter relative to the sleeve against the action of the spring to connect the second inlet port to both the first inlet port and to said outlet port.

LUDWIG A. MAJNERI.

REFERENCES CITED

The following references are of record in the file of this patent:

UNITED STATES PATENTS

| Number | Name | Date |
|---|---|---|
| 1,279,087 | Desmond | Sept. 17, 1918 |
| 2,343,809 | Schell | Mar. 7, 1944 |
| 2,367,194 | Boldt | Jan. 16, 1945 |